United States Patent [19]

Sakai et al.

[11] Patent Number: 5,392,339
[45] Date of Patent: Feb. 21, 1995

[54] TELEPHONE TRANSFER APPARATUS USING A SPECIAL SIGNAL FOR TRANSFER IN FACSIMILE COMMUNICATION

[75] Inventors: Nobukiyo Sakai; Tadashi Ishikawa; Takashi Sakayama; Michiaki Yoshihara; Takashi Nakajima, all of Iwatsuki, Japan

[73] Assignee: Fuji Xerox Co., Ltd., Tokyo, Japan

[21] Appl. No.: 772,342

[22] Filed: Oct. 7, 1991

[30] Foreign Application Priority Data

Oct. 18, 1990 [JP] Japan .................................. 2-279692
Oct. 24, 1990 [JP] Japan .................................. 2-284381

[51] Int. Cl.$^6$ ........................................ H04M 11/00
[52] U.S. Cl. .................................... 379/100; 379/165
[58] Field of Search ........................ 379/100, 96–98, 379/93, 355–357, 201, 209–216, 156, 157, 160, 171–173, 88, 89, 67, 165; 358/407, 405, 434–440, 442, 468

[56] References Cited

U.S. PATENT DOCUMENTS

| | | | |
|---|---|---|---|
| 4,353,097 | 10/1982 | Takada et al. | 379/100 |
| 4,737,982 | 4/1988 | Boratgis et al. | 379/212 |
| 4,825,461 | 4/1989 | Kurita et al. | 379/100 |
| 4,847,891 | 7/1989 | Kotani | 379/100 |
| 4,864,412 | 9/1989 | Ueno | 379/100 |
| 4,908,851 | 3/1990 | Kotani et al. | 379/100 |
| 4,920,560 | 4/1990 | Kageyama | 379/100 |
| 4,922,524 | 5/1990 | Baba et al. | 379/100 |
| 4,926,461 | 5/1990 | Kuok | 379/212 |
| 5,048,080 | 9/1991 | Bell et al. | 379/100 |
| 5,054,058 | 10/1991 | Kakizawa | 379/216 |
| 5,055,945 | 10/1991 | Oguma et al. | 379/100 |
| 5,175,760 | 12/1992 | Ohashi et al. | 379/100 |

FOREIGN PATENT DOCUMENTS

| | | | |
|---|---|---|---|
| 59-127472 | 7/1984 | Japan | 379/100 |
| 62-195974 | 8/1987 | Japan . | |
| 63-151259 | 6/1988 | Japan . | |
| 2170075 | 7/1986 | United Kingdom | 379/100 |

OTHER PUBLICATIONS

Xerox 3010 Facsimile Terminal Operator Manual, copyright 1989.

*Primary Examiner*—Wing F. Chan
*Attorney, Agent, or Firm*—Finnegan, Henderson, Farabow, Garrett & Dunner

[57] ABSTRACT

A telephone transfer apparatus for use in a facsimile network system, which is capable of carrying out telephone communications effectively. With a telephone transfer apparatus, it is possible to call up a telephone or an extension telephone having a telephone number registered in advance in case of detecting that a voice request has been established in a transmitting station or that the voice request has been required in a remote station. Accordingly, required information along with facsimile communications can be exchanged without the fall-off of efficiency of main operations.

12 Claims, 7 Drawing Sheets

FIG. 6

| DESIGNATED TIME | EXTENSION TELEPHONE NUMBER |
|---|---|
| 8 : 00 | 798 3420 |
| 12 : 00 | 798 3421 |
| 15 : 00 | 798 5111 |

FIG. 7

| TIME | EXTENSION TELEPHONE NUMBER | | | nTH NO. |
|---|---|---|---|---|
| | FIRST NO. | SECOND NO. | | |
| 8 : 00 | 798 3420 | 798 3422 | | 798 3428 |
| 12 : 00 | 798 3421 | 798 3423 | | 798 3429 |
| 15 : 00 | 798 5111 | 798 5110 | | 798 5112 |

TELEPHONE TRANSFER APPARATUS USING A SPECIAL SIGNAL FOR TRANSFER IN FACSIMILE COMMUNICATION

BACKGROUND OF THE INVENTION

The present invention relates to a telephone transfer apparatus, and more particularly to a telephone transfer apparatus for use in a facsimile network system, which is capable of carrying out telephone communications effectively.

After transmission of documents via facsimile communications, a telephone conversation may be required to notify transmission of documents, supplementary explanation of the transmitted documents and the like. In case of such a telephone conversation being required, an operator at a transmitting station is able to set a voice request mode to call up an operator at the remote station for telephone conversation after the transmission of documents.

In this case, however, the operator of the transmitting station who has set the voice request by means of an input means, is required to wait beside the facsimile terminal until the transmission of documents is completed. Since the time of reception cannot be predicted at the remote station, a person or an operator with whom the operator of the transmitting station wants to have a conversation is not always being nearby the facsimile terminal. In some cases, consequently, the remote station cannot respond to a call caused by the voice request.

In order to eliminate the difficulties accompanying the conventional system, an apparatus which is adapted to call an extension telephone in the remote station according to an instruction from the transmitting station and to communicate a message recorded in advance has been proposed in Published Unexamined Japanese Patent Application Nos. 195974/1987 and 16163/1989.

The conventional apparatus is adapted to call up the extension telephone of the remote station according to the instruction from the transmitting station and therefore the remote station has been limited to a facsimile terminal which has such specific functions. At the transmitting station, it is necessary to know the extension telephone number related to the remote station in advance.

In addition, there is a problem that only a fixed message can be communicated.

Further, with another conventional apparatus, the operator of the remote station is called up by sending an alarm sound or the like to the remote station. Consequently, the call according to the voice request can hardly be captured by the operator at the remote station if the operator is unskilled or sounding noise is excessively loud at the remote station.

To overcome such unfavorable conditions, a facsimile terminal has been proposed, which is adapted to produce a voice sent from the calling side (transmitting station) through a loud speaker means, instead of the call by the alarm sound in Published Unexamined Japanese Patent Application No. 151259/1988.

With such a conventional facsimile terminal, an excessively loud voice to inform a message is harsh to other persons in ambience and therefore the range of information by the speaker has been limited. Accordingly, if the operator is far away from the facsimile terminal, the operator cannot be aware of such alarm indicating the arrival of a message.

In addition, also at the transmission side, the operator should have stayed beside the facsimile terminal until the completion of the transmission of the document and the main work of the operator has been unavoidably interrupted.

Thus, the conventional apparatus is disadvantageous in that, if a telephone conversation is attempted according to the voice request either at the transmitting station or at the remote station, the operators would be restricted to stay beside the facsimile terminal until the transmission of the documents is finished, thereby resulting in degrading in work efficiency.

SUMMARY OF THE INVENTION

Accordingly, an object of the present invention is to provide a telephone transfer apparatus for use in a facsimile network system, which is capable of solving the above described problems and difficulties and allowing the telephone conversation through a nearby telephone after transmission of documents even when the operator is away from the facsimile unit.

The above, and other objects of the present invention are accomplished by the provision of a telephone transfer apparatus for use in a facsimile terminal comprising at least two telephone circuits connected between the facsimile terminal and an exchange means, a memory means for storing at least one telephone number for telephone conversation pursuant to a voice request with facsimile transmission, a detecting means for detecting that the voice request is established, via a facsimile communication carried out through the first telephone circuit, means for informing a remote station of circuit reservation in response to a detection signal from said detecting means, means for dialing the telephone number stored in the memory means to make the telephone conversation through the second telephone circuit in response to the detection signal to from the detecting means, and a circuit coupling means for releasing the circuit reservation to couple the remote station to the second telephone circuit to make the telephone conversation, when detecting an answer from a telephone having the telephone number stored in the memory means.

Further, according to the present invention, the telephone transfer apparatus for use in a facsimile terminal connected to a private branch exchange comprising a memory means for storing at least one telephone number of an extension telephone connected to the private branch exchange for telephone conversation pursuant to a voice request with facsimile transmission, a detecting means for detecting that the voice request is established, a hooking signal generating means for outputting a hooking signal to said private branch exchange in response to a detection signal which is output from said detecting means when the detecting means detects that the voice request is established and means for dialing the telephone number stored in the memory means to make the telephone conversation to the extension telephone through the private branch exchange in response to the hooking signal, the private branch exchange holding a state of connection to a remote station in response to the hooking signal and releasing the holding to make the telephone conversation when detecting an answer from the extension telephone.

Accordingly, the conversation can be done at the main operating position located away from the facsimile terminal at the side where the documents are transmitted and the telephone call can be received at a location away from the facsimile unit at the side where the documents are received.

BRIEF DESCRIPTION OF THE DRAWINGS

In the accompanying drawings:

FIGS. 6 and 7 are diagrams showing an example of contents stored in a dial digit storing part, respectively;

DESCRIPTION OF THE PREFERRED EMBODIMENTS

The present invention will be described in detail with reference to the accompanying drawings. First, the outline of an embodiment of the present invention is described referring to FIG. 2.

Figure 2:
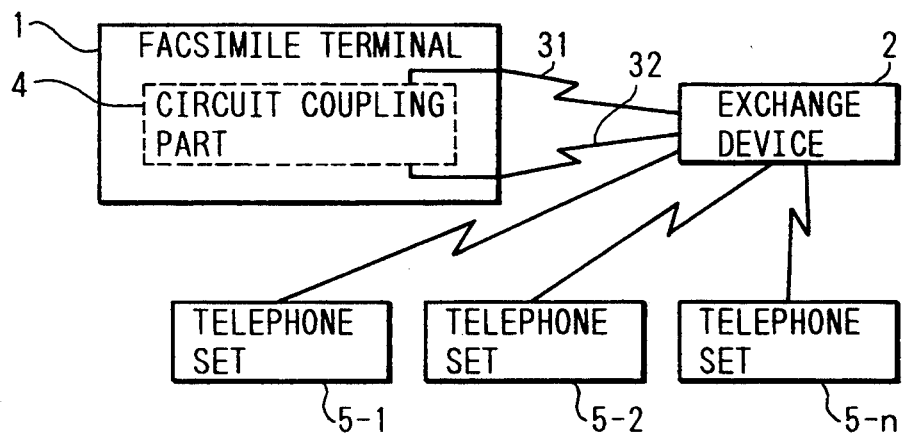
FIG. 2 is a block diagram showing the connection of a facsimile terminal and transfer destination telephones to an exchange device.

In FIG. 2, a facsimile terminal 1 is connected to an exchange device 2 coupled to a public telephone circuit through two telephone circuits 31 and 32. The facsimile terminal 1 is provided with a circuit coupling part 4 for coupling these two telephone circuits each other. The circuit coupling part 4 couples the telephone circuits in response to a circuit coupling signal described later. Many communication equipment such as telephones 5-1, 5-2, ... 5-n and facsimile terminals (not shown) are connected to the exchange device 2 coupled to the public telephone circuit.

Though the facsimile terminal 1 has various functions necessary for transmission and reception of image information, these functions are well known in the art, and therefore the description and drawings therefor are intentionally omitted.

With such a facsimile terminal as shown in FIG. 2, the conversation with a remote station is carried out as described below. In this case, it is assumed that the communication with the remote station is carried out by using the telephone circuit 31. When the transmission and reception of image information to/from the remote station is completed, a voice request procedure is executed in case of transmission. Subsequently, it is detected in the voice request procedure that the voice request has been established and the telephone set 5-1 registered as an expected party for communication is called up through the other telephone circuit 32. When the telephone set 5-1 is connected, the telephone circuits 31 and 32 are coupled by the line coupling part 4. On the other hand, in case of receiving the image information, the expected telephone set is called by using the other telephone circuit 32 after the voice request has been detected. Thus, the conversation after the reception of image information can be implemented by the expected telephone set located away from the facsimile terminal 1.

Figure 1:
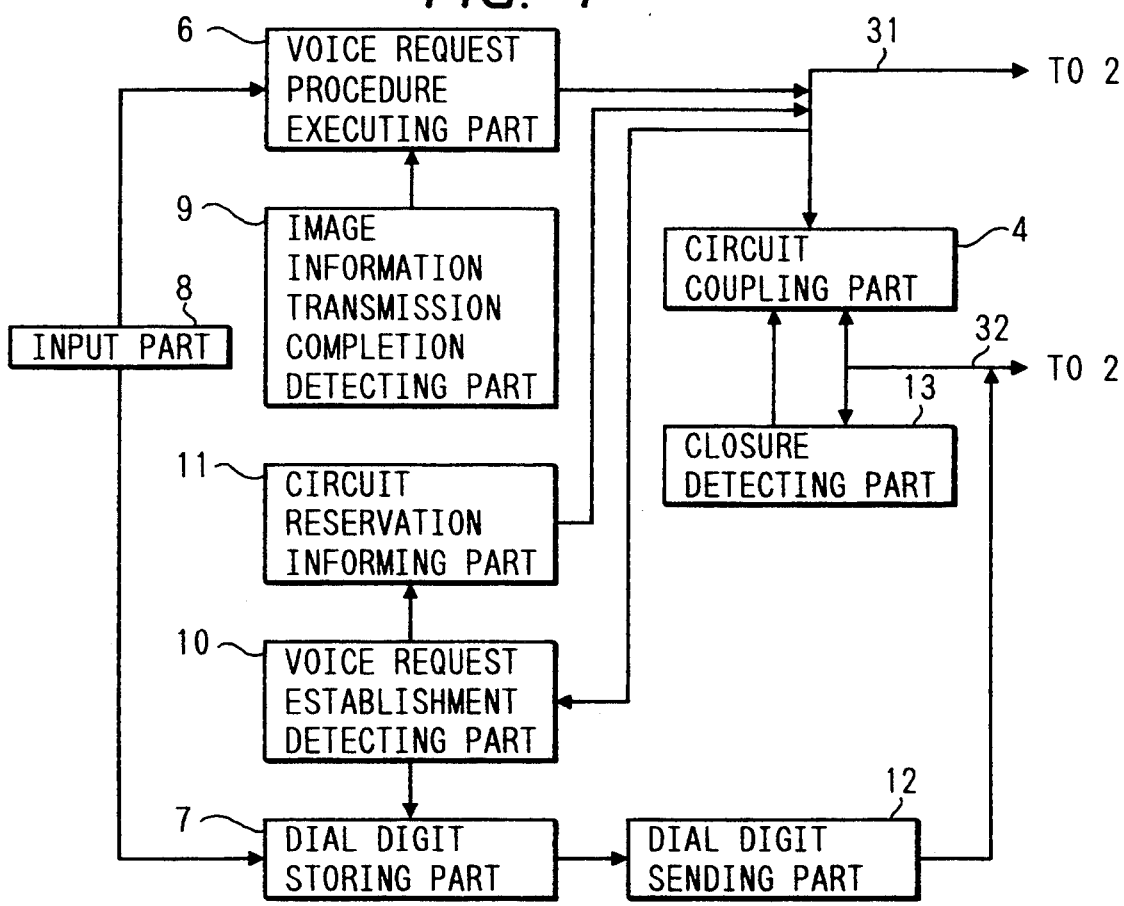
FIG. 1 is a block diagram showing a first embodiment of the present invention.

FIG. 1 is a block diagram showing an example of a facsimile terminal serving as a transmitting station in a facsimile network system.

In FIG. 1, it is stored in a voice request procedure executing part 6 that an instruction for requesting a telephone conversation has been issued, that is it is stored in the part 6 that a voice request has been issued. A telephone number for the telephone conversation in response to the voice request is registered in a dial digit storing part 7. The instruction for the voice request and the telephone number are registered by key operations on an input part 8 of the operation panel.

An image information transmission completion detecting part 9 detects that all expected image information has been transmitted to output a signal representing the completion of image information transmission to the voice request procedure executing part 6. If the voice request is stored in the voice request procedure executing part 6, the procedure interrupt signal Pri-EOP including the voice request is output in response to the output signal from the part 9.

The voice request establishment detecting part 10 detects the procedure interrupt permission signal PIP sent from the remote station in response to the telephone call based on the procedure interrupt signal Pri-EOP. A line reservation informing part 11 transmits an informing sound signal for instructing the remote station, that is, the receiving station to reserve the circuit in response to the detection signal of the procedure interrupt permission signal PIP output from the conversation reserve establishment detecting part 10.

On the other hand, the detection signal which is produced from the part 10 in response to the procedure interrupt permission signal PIP is also supplied to the dial digit storing part 7. The dial digit storing part 7 outputs dial digits stored therein through a dial digit sending part 12 to the other telephone circuit 32 in response to the detection signal.

A closure detecting part 13 monitors ring-back tone sent from the exchange device after transmission of the dial digits and detects the interruption of ring-back tone which indicates that the circuit with the expected telephone is closed. In response to this closure detection signal serving as a circuit coupling signal, the circuit coupling part 4 operates to connect the two telephone circuits 31 and 32 which are connected to the facsimile terminal 1.

If the two telephone circuits are connected, the telephone conversation after transmission of image information can be carried out with the designated telephone set other than the one of the facsimile terminal 1.

Figure 3:
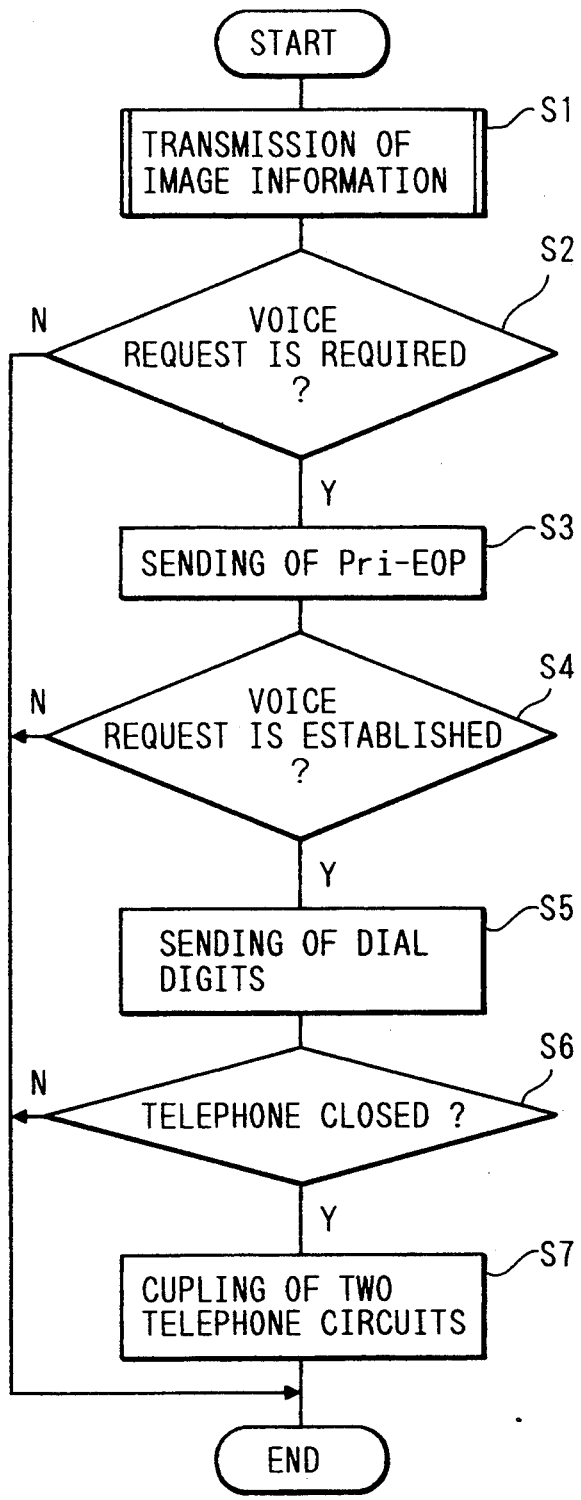
FIG. 3 is a flowchart showing the operation of the first embodiment.

FIG. 3 is a flowchart showing the operation of the facsimile terminal in this embodiment.

In FIG. 3, the image information is transmitted in step S1. When the transmission of image information is completed, the procedure advances to step S2.

In step S2, whether or not the voice request is set is determined and, if the voice request is set, the procedure advances to step S3.

In Step S3, the signal for execution of the voice request procedure, that is, the procedure interrupt signal Pri-EOP is transmitted to the remote station.

In step 4, whether or not the voice request is established is determined. In other words, it is determined whether or not the procedure interrupt permission signal PIP which is transmitted from the remote station in response to the signal Pri-EOP is received by the transmitting station. When the procedure interrupt permission signal PIP is detected, the procedure advances to Step S5.

In step S5, the telephone number which has been registered in advance by the operator is read out to the dial digit sending part 12 so that dialing is performed according to these dial digits to call the remote station with a circuit other than the circuit currently used for communication.

If the procedure interrupt permission PIP is not detected even through the procedure interrupt signal Pri-EOP has been transmitted more times than specified, the processing is finished assuming that the voice request is not established.

In step 6, whether or not a warbling tone is interrupted by the operator's lifting a handset at the remote station is detected in the closure detecting part 13. Based on the result of detection in the part 13, it is determined whether a communication circuit with an expected telephone set is closed or connected.

If the connection of the telephone communication circuit is confirmed in the step S6, the procedure advances to step S7 so that the circuit coupling part 4 is actuated to couple the telephone circuits 31 and 32.

If the connection of the telephone circuits is not detected by the closure detecting part 13 even though a predetermined time has elapsed, the determination in step S6 is denied and the processing is finished.

In this embodiment, the operator registers the telephone number of a transfer destination when he sets the voice request. With such a facsimile terminal, after the transmission of image information has been completed, the voice request procedure is automatically effected. Accordingly, if the voice request is established, the dialing is carried out according to the registered telephone number to call up the transfer destination through a telephone circuit other than the circuit under current communication of two telephone circuits connected to the facsimile terminal.

The second embodiment of the present invention will be described hereinafter. The second embodiment is adapted to meet the case where the telephone set called is busy or does not answer.

Figure 4:
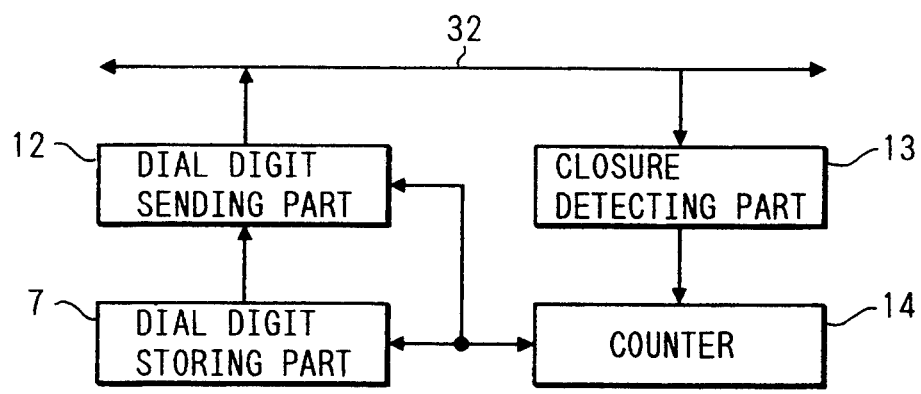
FIG. 4 is a block diagram showing a second embodiment of the present invention.

FIG. 4 is a block diagram showing principal parts of the second embodiment, and the parts which are the same or equivalent parts in FIG. 1 bear the same reference symbols or numerals.

With the second embodiment, a plurality of telephone numbers are registered in the dial digit storing part 7 and priority order is given to all telephone numbers.

The closure detecting part 13 detects a ring-back tone output from the exchange device 2 to the facsimile terminal 1 at the same time when the telephone is called up. A counter 14 is activated to start counting the number of interruptions of ring-back tone which is intermittently generated, when the closure detecting part 13 detects the ring-back tone. When the number of interruptions of ring-back tone reaches the specified number, the counter 14 outputs a count-up signal. The dial digit sending part 12 stops sending of dial digits in response to the count-up signal. The count-up signal is also supplied to the dial digit storing part 7 so as to supply the dial digits of a telephone set 5-2 to which the second priority following the telephone set 5-1 is given, to the dial digit sending part 12. The dial digit sending part 12 sends out the supplied dial digits to the line 32. If no answer is obtained from the registered telephone set 5-2, the operator gives up the calling, and sends out the on-hook signal to finish the communication.

Thus, all registered telephones are called in the order of priority until an answer arrives from the telephone being called.

In this second embodiment, whether or not a certain number of interruptions of the ring-back tone has been detected, is the criterion for decision to call the telephone number of the next priority. But, whether or not the time of generation of the ring-back tone measured by a timer has reached the expected time may be also the criterion for the decision. If it is determined based on the busy tone that the telephone circuit is busy, the dialing is carried out according to the next priority telephone number to call up the telephone having the next priority.

The third embodiment of the present invention which is adapted to allow selection of a transfer destination telephone depending on the time when the communication to be carried out and the transfer to a telephone from which an answer can be likely ensured. For this reason, a plurality of telephone numbers and the expected times corresponding to these telephone numbers are stored in the dial digit storing part 7. An example of information stored in the dial digit storing part 7 is showing in FIG. 6.

Figure 5:
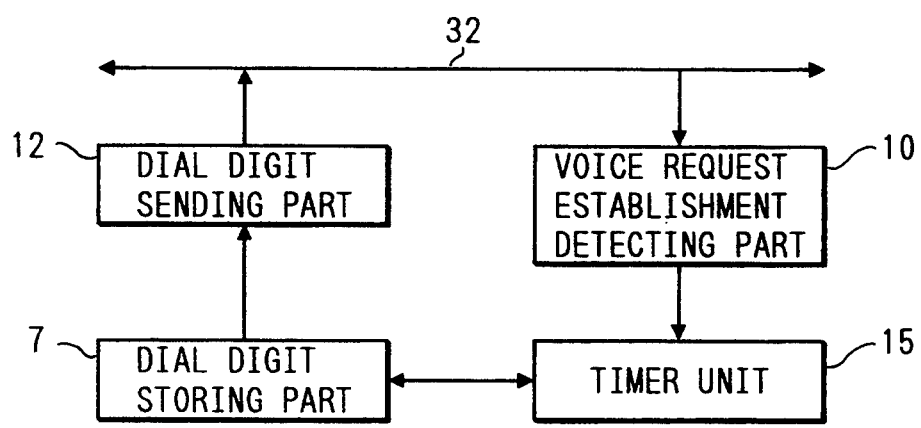
FIG. 5 is a block diagram showing a third embodiment of the present invention.

FIG. 5 is a block diagram showing the third embodiment and the principal part of the facsimile terminal 1. The same reference numerals and symbols designate the same or equivalent parts, respectively.

In FIG. 5, when it is detected by the voice request establishment detecting part 10 that the voice request has been established, the detection signal is output to a timer 15. The timer 15 outputs the current time to the dial digit storing part 7 in response to the detection signal of voice request establishment. The dial digit storing part 7 to which the current time is supplied retrieves a time closest to the current time from the stored information (time). And the telephone number corresponding to the retrieved time is set in the dial digit sending part 12 to set out to the circuit 32.

In the third embodiment, a telephone from which a positive answer is expected depending on the time can be called up from a plurality of telephone numbers registered.

Though the time is stored in the dial digit storing part 7, expected time zones may be stored to detect which time zone the current time belongs to and a telephone corresponding to the retrieved time zone can be called up.

The following describes the fourth embodiment of the present invention. The third embodiment is adapted to call up a telephone which seems to provide a positive answer depending on the time or time zone. In addition, for further certainty, the fourth embodiment may be adapted to allow registering of a plurality of telephone numbers to which the priorities in accordance with the time or time zone are given.

An example of information stored in the dial digit storing part 7 in case of the fourth embodiment is shown in FIG. 7.

In the fourth embodiment, the time of the dial digit storing part 7 is retrieved based on such stored information as described above. The telephone with the telephone number stored in the first priority as to the time is called up.

If a response is detected, the conversation can be commenced by connecting the circuit and, if no answer is detected or the line circuit is busy, the telephone stored with the second priority is called up. Subsequently, other telephones are called up in sequence while lowering the priority until the answer is detected.

The function of the principal part of the fourth embodiment is obtained by combining the functions shown in relation to both the second and third embodiments of the present invention and therefore the illustrations and descriptions are omitted intentionally.

The above describes the first to fourth embodiments with a example of calling of an extension telephone particularly in the transmitting station and, also in the receiving station, the telephone can similarly be called up.

In other words, when it is detected at the remote station after the reception of image information that the voice request has been requested by the transmitting side, as is similar in the transmitting station, an expected telephone can be called up by using a circuit other than the circuit currently used for communications as described above.

For execution of such operation, a voice request detecting means which corresponds to the voice request establishment detecting part 10 of the facsimile terminal, is provided to a facsimile terminal acting as a remote station. This voice request detecting means detects from the reception of the procedure interrupt signal Pri-EOP transmitted from the transmitting station that the voice request has been instructed. The dial digits registered in advance are output to call up the expected telephone in response to the detection output signal of the voice request detecting means.

Thus, the telephone transfer operation based on the voice request can be carried out also in the receiving station as described in relation to the first to fourth embodiments only by replacing the voice request establishment detecting part 10 with the voice request detecting means.

In this case, however, since it is impossible for the remote station to predict when the voice request is instructed, it is necessary to store the telephone number of a transfer destination in the dial digit storing part 7 at the remote station in advance.

Figure 9:
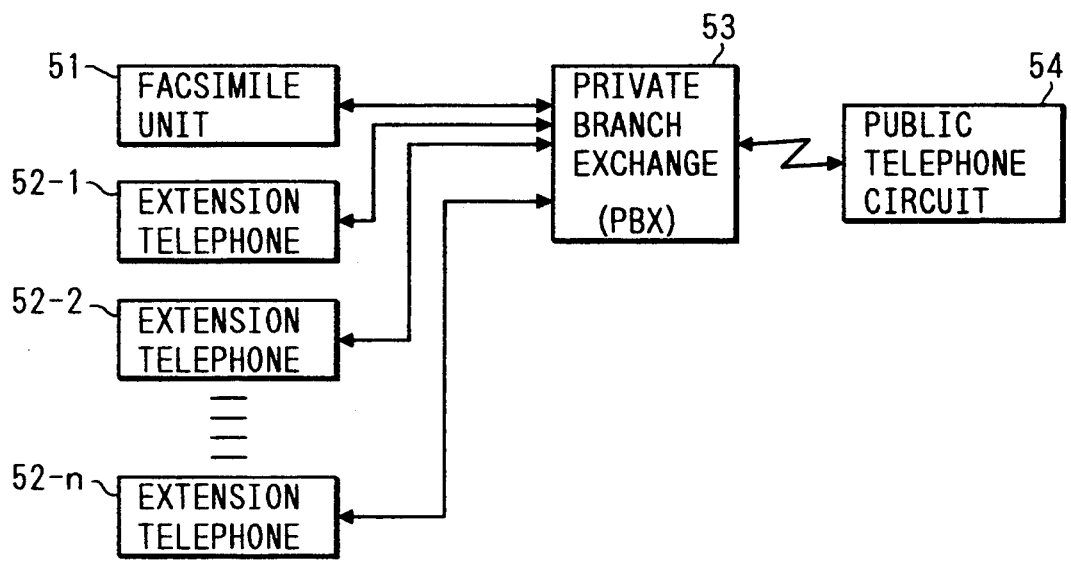
FIG. 9 is a block diagram showing the connection of a facsimile terminal and extension telephones to an exchange device.

In all embodiments described above, transfer destination telephones are connected to the exchange device of the public telephone network. However, internal extension telephones connected to a private branch exchange device (hereinafter referred to merely as a PBX) may be registered as a transfer destination. FIG. 9 is a schematic diagram showing a connection of the facsimile terminal and the internal extension telephones connected to the private branch exchange device PBX.

In FIG. 9, the facsimile terminal 1 and extension telephone 52-1–52-n are connected to the PBX 53 which is connected to the public telephone circuit 54 serving as a public telephone network. The PBX 53 operates to connect and disconnect the connection among the facsimile terminal 51, the extension telephones 52-1, 52-2, –52-n and the public telephone network 54.

In such a configuration as shown in FIG. 9, the circuit connected to the facsimile terminal 1 is switched over to one of the extension telephones 52-1–52-n to make a telephone conversation with a remote station in response to the voice request from the transmitting station after the completion of the facsimile transmission.

Figure 8:
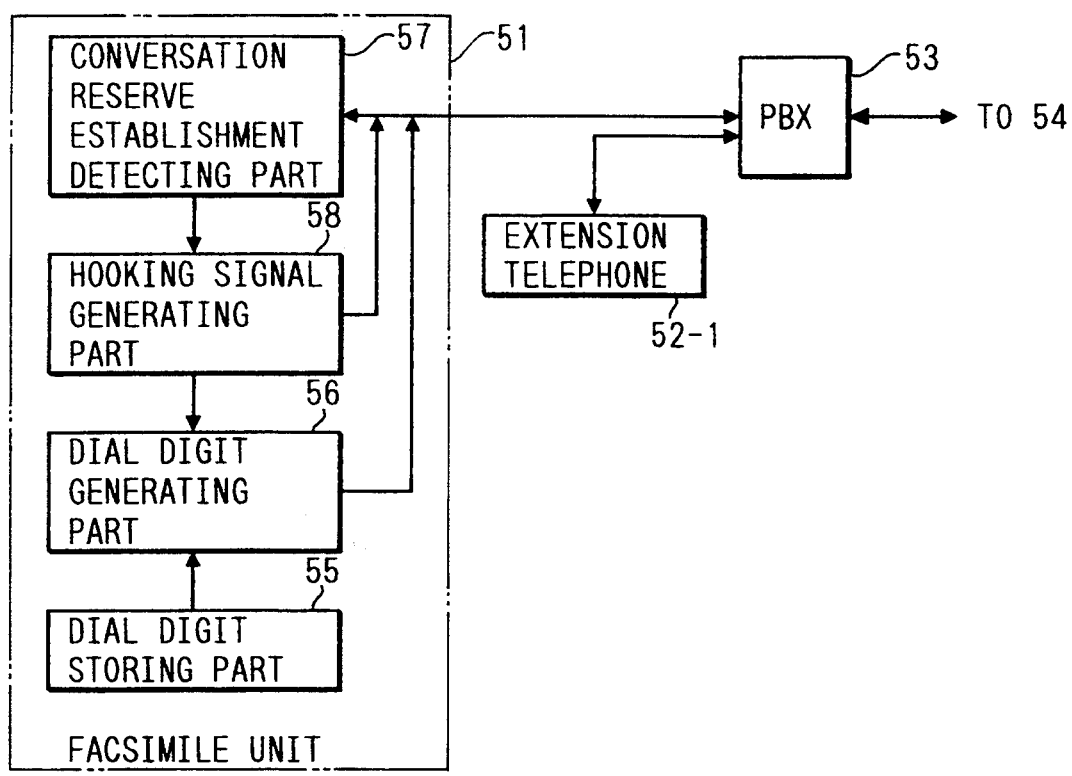
FIG. 8 is a block diagram showing the fourth embodiment according to the present invention.

FIG. 8 is a block diagram showing a fifth embodiment of the present invention in which a facsimile terminal 51 serving as a transmitting station and an extension telephone 52-1 are connected to the PBX 53.

In FIG. 8, an extension telephone number for telephone conversation in response to the voice request is registered in a dial digit storing part 55. This telephone number is registered by the operator from an input part such as a keyboard (not shown), at the same time when the direction for the voice request is set.

The facsimile terminal 51 executes the voice request procedure according to the voice request after the completion of the facsimile transmission of image information. When the voice request is required, that is, when the procedure interrupt signal Pri-EOP is sent out from the transmitting station, the procedure interrupt permission signal PIP is transmitted from the remote station through the PBX 53 in response to the above signal pri-EOP. A voice request establishment detecting part 57 detects this procedure interrupt permission signal PIP so as to recognize the establishment of voice request.

A hooking signal generating part 58 outputs a hooking signal to the PBX 53 in response to the detection signal of the detecting part 57, which indicates that the conversation reserve has been established. The hooking signal is a short time on-hook (loop-off) signal. This hooking signal is also supplied to the dial digit storing part 55 so that the extension telephone number is supplied from the dial digit storing part 5 to the dial digit generating part 56 which sends out this extension telephone number to the PBX 53.

While holding connection with the line wire in response to the hooking signal, the PBX 53 analyzes a telephone number supplied from the facsimile terminal 51 and outputs a call signal to an appropriate extension telephone, for example, the extension telephone 52-1. When the extension telephone 52-1 makes an answer, the facsimile terminal 51 releases the extension telephone circuit and the PBX 53 cancels holding of the line wire and switches over the connection to the extension telephone.

Figure 10:
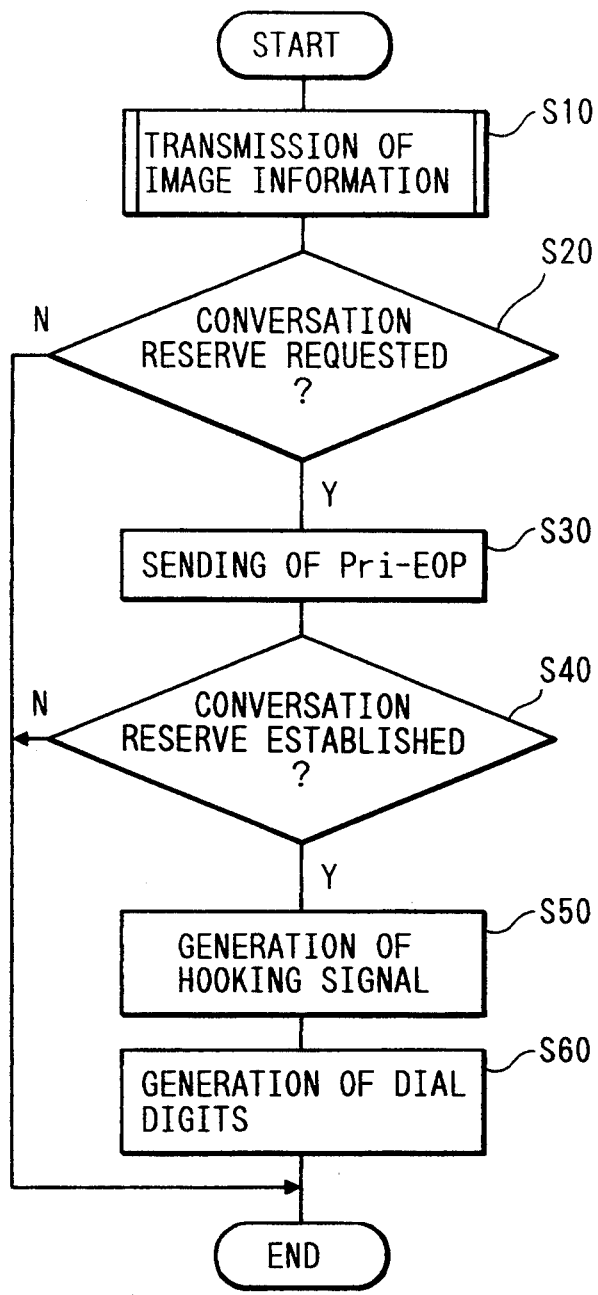
FIG. 10 is a flowchart showing the operation of the fourth embodiment.

FIG. 10 is a flowchart showing the operation of the facsimile terminal in the fifth embodiment of the present invention.

In FIG. 10, the image information is transmitted via facsimile in step S10. When the facsimile transmission of image information is completed, the procedure advances to step S20.

In step S20, whether or not the voice request is required is determined and, if required, the procedure advances to step S30.

In step S30, the signal for execution of the conversation reserve procedure, that is, the procedure interrupt signal Pri-EOP is sent out.

In step S40, whether or not the voice request is established or the procedure interrupt permission signal PIP is detected is determined. When the procedure interrupt permission signal PIP is detected, the procedure advances to step S50 in which the hooking signal is generated. If the procedure interrupt permission signal PIP is not detected even though the procedure interrupt signal Pri-EOP has been sent out more times than specified, the processing is finished assuming that the voice request is not established.

In step S60, in response to the generation of the hooking signal, the extension telephone number registered in advance by the operator is read out from the dial digit storing part 50 and the dial digits are generated in accordance with this extension telephone number.

Subsequently, the PBX 53 calls up the extension telephone on the basis of the dial digits supplied.

Thus, in this embodiment, an extension telephone number which is a transfer destination is registered in advance before the voice request is designated. With this embodiment, the voice request procedure is executed after the facsimile transmission of image information has been finished and, if the voice request is established, the registered extension telephone number can be called by hooking.

The sixth embodiment of the present invention will be described with reference to FIG. 11. The second embodiment is adapted to meet the case where the extension telephone called is busy or does not answer.

Figure 11:
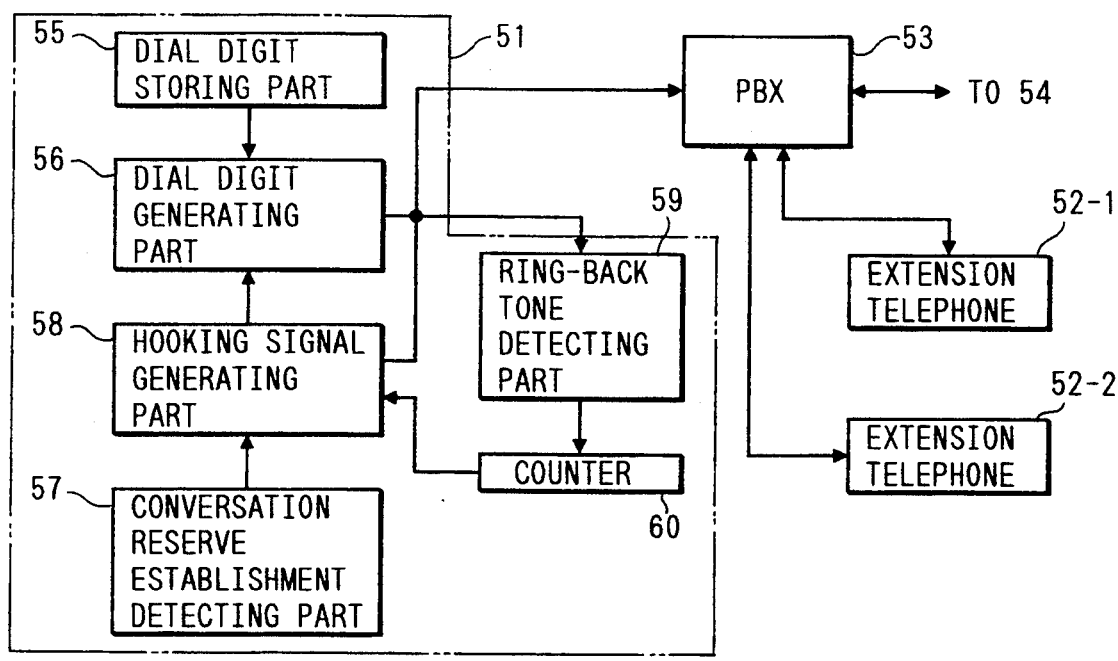
FIG. 11 is a block diagram showing a fifth embodiment of the present invention.

FIG. 11 is a block diagram of principal parts of the sixth embodiment,and the same reference numerals and symbols designate the same or equivalent parts as shown in FIG. 8.

In case of this sixth embodiment, a plurality of telephone numbers are to be registered in the dial digit storing part 55 and priority order are given to all telephone numbers.

A ring-back tone detecting part 59 detects a ring-back tone output from the PBX 53 to the facsimile terminal 51 at the same time the extension telephone is called up. The counter 10 is activated when the ring-back tone detecting part 9 detects the ring-back tone and counts the number of interruptions of ring-back tone which is intermittently generated. When the number of interruptions of ring-back tone reaches the specified number, the counter 60 outputs an count-up signal. The hooking signal generating part 58 outputs a hooking signal two times in response to the count-up signal.

The PBX 53 cancels holding of the line wire in response to the first hooking signal and then stops outputting of the call signal to the extension telephone being currently called, the extension telephone 52-1 for example and the ringing to the facsimile unit 51.

The PBX 53 outputs again the line wire holding signal in response to the second hooking signal.

In response to the second hooking signal, the dial digit generating part 56 reads the dial digits of the extension telephone 52-2 which is given the priority following that of the extension telephone 52-1 called previously, from the dial digit storing part 55. According to the thus read out dial digits, the PBX 53 operates to call up the extension telephone 52-2. If no response from the extension telephone 52-2 is received, the PBX 53 gives up calling and releases the circuit by on-hook operation.

All registered extension telephones are called in the order of priority until an answer is received by the PBX 53.

In the sixth embodiment, whether or not interruption of the ring-back tone has been detected as many times as expected is the criterion for decision to call the next telephone having the next priority but whether or not the time of generation of the ring-back tone measured by the timer has reached the expected time may be the criterion for determination. If it is determined based on the busy tone that the extension telephone is now busy, the next priority telephone number is also dialed as in this embodiment.

The seventh embodiment of the present invention will be described below with reference to FIG. 12. The seventh embodiment is adapted to allow selection of a transfer destination telephone depending on the time when the communication to be carried out and the transfer to a telephone from which an answer can be likely ensured. For this reason, a plurality of extension telephone numbers and the expected times corresponding to these telephone numbers are stored in the dial digit storing part 55. An example of information stored in the dial digit storing part 55 is shown in FIG. 6.

Figure 12:
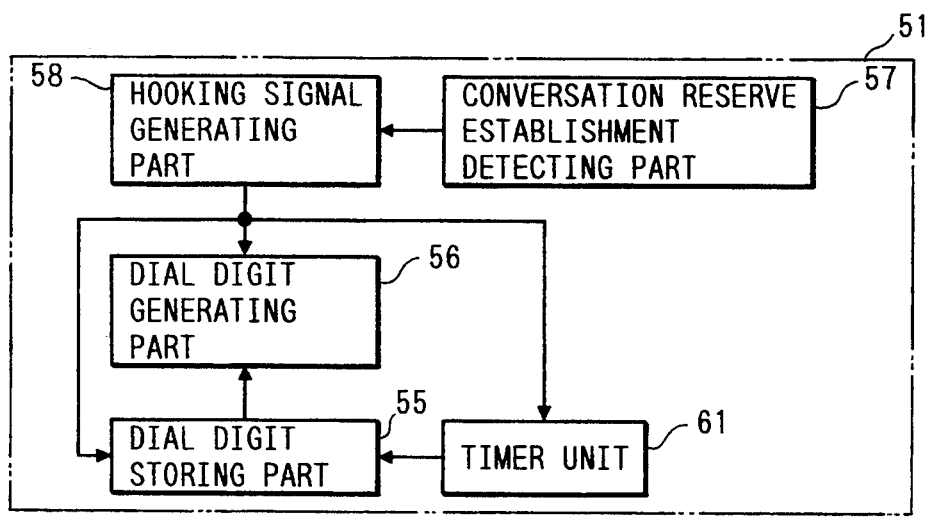
FIG. 12 is a block diagram showing a third embodiment of the present invention.

FIG. 12 is a block diagram showing the principal part of the facsimile terminal 51 which is to be used in the seventh embodiment or the present invention. The same reference numerals as those in FIG. 8 denote the same or equivalent parts therein.

In FIG. 12, when the fact that the voice request has been established is detected by the voice request establishment detecting part 57, a hooking signal is output from the hooking signal generating part 58 to the timer unit 61. The timer unit 61 outputs the current time to the dial digit storing part 55 in response to the hooking signal. The dial digit storing part 56 to which the current time is supplied retrieves a time closest to the current time from the stored information (time). And the extension telephone number corresponding to the retrieved time is output from the dial digit storing part 55 to the dial digit generating part 56.

In the seventh embodiment, an extension telephone from which a positive answer is expected depending on the time can be called up within a plurality of telephone numbers registered.

Though the time is stored in the dial digit storing part 55, expected time zones may be stored to detect which time zone the current time belongs to and an extension telephone corresponding to the retrieved time zone can be called up.

The seventh embodiment of the present invention is adapted to call up an extension telephone which seems to provide a positive answer depending on the time or time zone.

In order to improve the accuracy of the seventh embodiment, the seventh embodiment is modified so as to allow registering of a plurality of extension telephone numbers respectively given the priorities with regard to the time or time zone. An example of such a modification will be described as a eighth embodiment. An example of information stored in the dial digit storing part 55 in case of the eighth embodiment is shown in FIG. 7.

With the eighth embodiment, the time of the dial digit storing part 55 is retrieved in view of the current time. The extension telephone having the extension telephone number stored with the first priority concerning the time is called up.

If answer is detected, the telephone conversation can be commenced by connecting the circuit whereas if no answer is received or the line circuit is busy, the extension telephone stored with the second priority is called up. Subsequently, the telephone are called up in sequence while lowering the priority until the answer is received.

The function of the principal part of the eighth embodiment is obtained by combining the functions shown in relation to both the sixth and seventh embodiments of the present invention and therefore the illustrations and descriptions are omitted.

The above describes the fifth to eighth embodiments with an example of calling of the extension telephone particularly in the transmitting station. The facsimile terminal may be used as a remote (receiving) station in the same manner as described above with regard to the first to fourth embodiment of the present invention. More specifically, as is similar to these embodiments, the voice request requirement detecting means is provided to the facsimile terminal serving as the remote station instead of the voice request establishment part 57. Further, since it is impossible for the remote station to predict when the voice request is instructed, it is necessary to store the telephone number of a transfer destination in the dial digit storing part 55 at the remote station in advance.

As is apparent from the above description, the present invention allows to call up a telephone or an extension telephone having a telephone number registered in advance in case of detecting that the voice request has been established in the transmitting station or that the voice request has been required in the remote station. Therefore, required information along with facsimile communications can be exchanged without the fall-off of efficiency of main operations.

What is claimed is:

1. A telephone transfer apparatus including a facsimile terminal connected to a private branch exchange and comprising:
   a memory means for storing at least one telephone number of an extension telephone connected to said private branch exchange for voice circuit connection, the one telephone number being a number of the extension telephone;
   a detecting means at the facsimile terminal for detecting a request for voice circuit connection from a transmitting station and providing a detection signal;
   a hooking signal generating means for outputting a hooking signal to said private branch exchange in response to the detection signal; and
   means for dialing the one telephone number stored in said memory means to make a voice circuit connection to the extension telephone through said private branch exchange in response to the hooking signal;
   said private branch exchange holding a state of connection to the transmitting station in response to the hooking signal and releasing the held state of connection to complete the voice circuit connection when detecting an off-hook signal from the extension telephone.

2. A telephone transfer apparatus for use in a facsimile terminal comprising:
   at least first and second telephone circuits connected between said facsimile terminal and an exchange means;
   a memory means for storing at least one telephone number for voice circuit connection, the one telephone number being a number of a telephone set for connection through the second telephone circuit;
   a detecting means for detecting that a request for a voice circuit connection is acknowledged via a facsimile connection to a remote station through the first telephone circuit;
   means for informing the remote station of a detection signal from said detecting means;
   means for dialing the one telephone number stored in said memory means to make the voice circuit connection to the telephone set through the second telephone circuit in response to the detection signal from said detecting means; and
   a circuit coupling means for releasing the first telephone circuit to enable the telephone set and the second telephone circuit to make the voice circuit connection upon detecting an off-hook condition from the telephone set, wherein said detecting means transmits a procedure interrupt signal Pri-EOP to the remote station in response to the request for the voice circuit connection and said detecting means receives a procedure interrupt permission signal PIP which is produced by the remote station in response to the reception of the Pri-EOP signal to thereby detect the acknowledgment of the request for the voice circuit connection.

3. The telephone transfer apparatus as defined in claim 2 including a telephone circuit closure detector, wherein said memory means stores at least a first telephone number and a second telephone number of respective first and second telephone sets for voice circuit connection, and when said telephone circuit closure detector receives no off-hook signal from the first telephone set after transmission of a predetermined number of ring-back signals, said dialing means dials the second telephone number stored in said memory means to make the voice circuit connection through the second telephone circuit.

4. The telephone transfer apparatus as defined in claim 2 wherein said memory means stores a plurality of telephone numbers to which a priority order is given for voice circuit connection, and which plurality of telephone numbers corresponds to a respective plurality of telephone sets, and said dialing means first dials the telephone number first in the priority order and, when no off-hook signal is received, dials another telephone number according to the priority order.

5. The telephone transfer apparatus as defined in claim 2 wherein said memory means stores a plurality of telephone numbers, each having a time period of availability for voice circuit connection and each corresponding to a respective telephone set, and said dialing means dials one of said plurality of telephone numbers according to a match between respective time period of availability and calling time.

6. The telephone transfer apparatus as defined in claim 5 wherein the plurality of telephone numbers comprises a plurality of groups of telephone numbers, each of said groups having a respective time period of availability for voice circuit connection, each of said groups of telephone numbers comprising a plurality of telephone numbers to which a priority order is given for voice circuit connection, each telephone number corresponding to a respective telephone set, and said dialing means dials a telephone number according to said match between said respective time period of availability and calling time and, within a group, according to the respective priority order.

7. A telephone transfer apparatus including a facsimile terminal connected to a private branch exchange and comprising:
   a memory means for storing at least one telephone number of an extension telephone connected to said private branch exchange for voice circuit connection;

a detecting means for detecting that a request from said facsimile terminal for a voice circuit connection is acknowledged at a remote station and providing a detection signal;

a hooking signal generating means for outputting a hooking signal to said private branch exchange in response to the detection signal; and means for dialing the at least one telephone number stored in said memory means to make the voice circuit connection to the extension telephone through said private branch exchange in response to the hooking signal;

said private branch exchange holding a state of connection to the remote station in response to the hooking signal and releasing the held state of connection to connect the remote station to the extension telephone when detecting an off-hook signal from the extension telephone.

8. The telephone transfer apparatus as defined in claim 7 wherein said detecting means transmits a procedure interrupt signal Pri-EOP to the remote station in response to the request for voice circuit connection and said detecting means receives a procedure interrupt permission signal PIP which is produced by the remote station in response to the reception of the Pri-EOP signal to thereby detect the acknowledgment of the request for voice circuit connection.

9. The telephone transfer apparatus as defined in claim 8 wherein said memory means stores a plurality of telephone numbers to which a priority order is given for voice circuit connection, and which plurality of telephone numbers corresponds to a respective plurality of extension telephones including the at least one extension telephone, and said dialing means first dials the telephone number first in the priority order and, when no off-hook signal is received, dials the other telephone number according to the priority order.

10. The telephone transfer apparatus as defined in claim 8 including a telephone circuit closure detector, wherein said memory means stores at least a first telephone number and a second telephone number of the at least one extension telephone and a second extension telephone, respectively, and when said telephone circuit closure detector receives no off-hook signal from the at least one extension telephone after transmission of a predetermined number of ring-back signals, said dialing means dials the second telephone number stored in said memory means to make the voice circuit connection through said private branch exchange.

11. The telephone transfer apparatus as defined in claim 8 wherein said memory means stores a plurality of telephone numbers, each having a time period of availability for voice circuit connection and each corresponding to a respective one of a plurality of extension telephones including the at least one extension telephone, and said dialing means dials one of said plurality of telephone numbers according to a match between time period of availability and calling time.

12. The telephone transfer apparatus as defined in claim 11 wherein the plurality of telephone numbers comprises a plurality of groups of telephone numbers, each of said groups having a respective said time period of availability for voice circuit connection, each of said groups of telephone numbers comprising a plurality of telephone numbers to which a priority order is given for voice circuit connection, each telephone number corresponding to a respective one of a plurality of extension telephones including the at least one extension telephone, and said dialing means dials a telephone number according to the respective time period of availability and, within a group, according to the respective priority order.

* * * * *